INVENTOR.
HERMAN L. BLASBALG
BY George C. Kentorny
AGENT 3,432,619
Patented Mar. 11, 1969

3,432,619

RANDOM-ACCESS COMMUNICATION SYSTEM EMPLOYING PSEUDO-RANDOM SIGNALS

Herman L. Blasbalg, Baltimore, Md., assignor to International Business Machines Corporation, New York, N.Y., a corporation of New York Filed July 31, 1963, Ser. No. 298,877
U.S. Cl. 179—15 17 Claims
Int. Cl. H04j *5/00, 7/00;* H04b *1/44*

This invention relates to communication systems. More particularly the invention relates to a multiple-subscriber, random-access communications system.

The prior art is replete with communications systems for effecting the exchange of messages between more than two subscribers. All of these systems have been faced with a common problem, namely that of allocating the communications channel—be it wire or some other medium—for use of the subscribers. For example, those communications systems commonly known as time-division systems, control the allocation, or assignment, of a communications channel to a particular subscriber by assigning that subscriber certain time period during which he is given access to the communications channel. Only during these time periods, often referred to as time slots, can the subscriber communicate. At all other times, he is prevented from gaining access to the communications channel, because other subscribers must also have their exclusive opportunity for communicating. In addition to the fact that such communication systems may prevent a particular subscriber from saying what he wants to say, when he wants to say it, for example, in the case of emergency situations, time division multiplexing systems suffer from an even more significant disadvantage. To prevent chaos, that is, to prevent more than one user from gaining access to the communications channel at the same time, which could only result in garbled message transmission, all of the subscribers to a given system must follow a common time reference so that they will not, inadvertently or otherwise, access the channel during a time period which, in fact, has been assigned to another subscriber. At the ever increasing speeds, and the ever increasing number of subscribers, at which communications are being carried on today, these synchronous systems require complex and accurate timing means which must start from a common reference, and which must not deviate therefrom for long periods of time.

Accordingly, it is a prime object of this invention to effect communications between multiple subscribers in a new and improved manner.

It is another object of this invention to effect the communications between multiple subscribers in an asynchronous manner without requiring reference to a common time scale.

The prior art also teaches time asynchronous communication systems for achieving the communications between multiple subscribers. Briefly, these systems overcome the above-mentioned major disadvantages of the time-division type, by assigning selected portions of a frequency spectrum of the communication channel to individual susbcribers. Such systems instead of allocating time slots, i.e, time-multiplexing, allocate frequencies so that the system becomes of the well known frequency-division type. While such approaches overcome the inherent problems of time division multiplexing, it is well known that the main drawback of these systems lies in their very inefficient use of the bandwidth of the communications channel. Furthermore, neither systems of the frequency-division type, nor of the time-division type, ever allow a subscriber to claim all of the transmission channel whenever it becomes desirable or necessary. Therefore, less than total allocation of the full bandwith of the communications channel, less than all of the time, results in the above-mentioned drawbacks and further, prevents truly random-access communications, that is, it prevents more than two subscribers from ever claiming the same transmission channel, varying in both time and frequency. Another and very significant disadvantage inherent in present day communications systems resides in their limitation on the maximum number of users. Each system is designed to handle only a predetermined maximum number of users and the systems break down abruptly when this upper limit is exceeded.

Accordingly, it is another prime object of this invention to provide a true random-access communications system for multiple subscribers.

It is another object of this invention to provide a multiple-subscriber communication system in which all the subscribers can have instantaneous access to the entire communications channel at any time.

It is yet another object of this invention to provide a random access communications system which degrades gracefully when the optimum number of subscribers is exceeded.

Recent years have seen the development of hybrid communications systems which attempt to achieve the goals of truly random-access communications by combining the teachings of time and frequency-division systems. For example, there have been proposed communication systems of the so-called F (frequency) T (time) pattern type. These systems achieve random-access communications by dividing the communications channel, which has both frequency and time as its principal parameters, in such a fashion that each subscriber is assigned a unique pattern of signals. That is, the parameters of frequency and time can be represented in an $x$–$y$ coordinate system with frequency being one of the axes, and time being the other one. By subdividing each of these parameters into a number of smaller dimensions, a checkerboard matrix is created which allows the so-called "addressing" of particular subscribers, by generating particular "address" patterns. Briefly, a particular subscriber is distinguished from all other subscribers by the presence (or absence) of signals in certain portions of the frequency spectrum, at certain times. For example, only when a particular subscriber has received its unique pattern, say F1 at T1, F3 at T2, F7 at T3, no F at T4, no F at T5, and F4 at T6, does it respond internally to generate a particular message symbol which this pattern represents, for example, a binary one. While systems such as these do achieve random-access communications, those skilled in the art will appreciate that such approaches still retain some of the disadvantages inherent in the above-mentioned systems. For example, systems of the F–T pattern type will require synchronization between the transmitting and receiving subscribers so that a receiver will know how to properly decode its particular F–T pattern. This is particularly true, when calls are initially being attempted. To discriminate against possibly spurious noise signals that may be present in the communications channel for some arbitrary time periods, the receiver must employ precise clocking to detect its initial "address" pattern and furthermore, precise clocking is also required so that the receiver may not falsely assume that it has been called due, for example, to time shifts of the signals in the transmission medium when the pattern of another subscriber has in fact been transmitted by a calling transmitter.

Accordingly, it is yet another object of this invention to provide a random-access communication system in which no synchronization is ever required between the subscribers.

Furthermore, systems of the F–T type can be shown to require a large amount of bandwidth per user, so that the maximum number of subscribers which may share a given portion of the frequency spectrum is limited for acceptable error rates. Even further, F–T systems are basically of the type in which the information detection process focuses principally on the amplitude of the received signals, which makes these systems peculiarly sensitive to the so-called "dynamic range" problem, a situation which occurs when a powerful adjacent transmitter "drowns out" a nearly listening subscriber who in fact is being engaged in communications with another distant transmitter. Under certain conditions, one of the simple means of combating the "dynamic range" problem, which is common to most all communication systems, is the use of so-called "hard limiting," that is, clipping received signals about their zero reference level to standardize the received signals. When this is attempted with F–T systems, the limiting process unfortunately removes not only the unwanted signals but also the information itself.

Accordingly, it is yet another object of this invention to provide a random-access communication system in which hard limiting can be employed with no detrimental effects.

It is yet another object of this invention to transmit information signals not dependent on the amplitude thereof to convey information.

Finally it is noted that existing communication systems are inherently limited in the number of subscribers which can be accommodated. Since most of these systems are based on a prior allocation of one of the parameters of the communication channel, the number of potential subscribers, i.e., those which may want to use the system, is in fact bounded by an upper limit, namely the total number of active subscribers, i.e., those which can be accommodated.

Accordingly, it is yet another object of this invention to provide a multiple-subscriber random-access communication system in which the potential number of subscribers is not limited by the number of active subscribers.

According to the most basic aspect of the invention, random-access communication between multiple subscribers is achieved by allocating to each subscriber a unique signal waveform, rather than allocating either time and/or frequency, as the prior art systems have done. Each subscriber has a different signal waveform in terms of which it is addressed and communications between any two subscribers are effected by encoding the message information in terms of these "address" signal waveforms.

The noise rejection capabilities and the discriminability of so-called "orthogonal" signal waveforms is well known to those skilled in the art. That is, two signal waveforms are said to be "orthogonal" when they are as different as possible, in as many as possible respects. When such so-called orthogonal functions are generated in terms of time varying signals, it is quite easy to distinguish between them with proper detection means. Unfortunately, orthogonal signal waveforms, although possessing very desirable properties, are not entirely suitable for use in random-access communication systems, first because there is a rather limited number of them available (which would limit the total number of subscribers in a system, where each subscriber is assigned an orthogonal waveform) and second, because their generation in terms of time varying electrical signals becomes, in all except the simplest cases, a very costly, and frequently unsuccessful, proposition.

According to the invention, the use of truly orthogonal signal waveforms is dispensed with because it has been discovered that signal waveforms having so-called quasi-orthogonal properties are far more numerous and easier to generate than truly orthogonal signal waveforms. Furthermore, their discriminability, that is, the extent to which each quasi-orthogonal signal waveform is different from each and every other quasi-orthogonal signal waveform of the class, while not as high as in the case of truly orthogonal signal waveforms, is more than adequate for the purposes of random-access communications.

The concept of quasi-orthogonality has its roots in the mathematical function known as the cross-correlation function, well known to those skilled in information theory. Briefly, this function gives some measure of the difference between two or more time varying signals. For example, the cross-correlation coefficient of two truly orthogonal functions will be zero. The cross-correlation coefficient may be viewed as a summation, over a number of intervals, of the number of matches and mismatches of two time varying signals. When two signals are totally different, their cross-correlation coefficient will be zero, that is, the number of times that they match is equalled by the number of times that they mismatch. Quasi-orthogonal functions deviate from these idealized cases in that the number of matches somewhat exceeds the number of mismatches, or vice-versa, so that their cross-correlation coefficient is low, but greater than zero.

The signal waveforms utilized according to the invention have a further, and independent, characterization. Those skilled in the art will recognize that the complexity of signal waveforms, that is the number of respects in which one signal waveform may differ from another waveform, depends on the dimensionality, or the number of degrees of freedom, that a signal waveform may have. The dimensionality of a signal waveform is conveniently expressed with reference to the so-called WT product thereof, which represents a dimensionless index formed from the product of the bandwidth times the duration of the signal waveform. Subject to certain theoretical limitations, which do not effect the invention, it is accurate to say that the larger the WT product of a signal waveform, the more it is adapted for use as an "address" signal in a random-access communications system. According to one preferred embodiment of the invention, the WT product of the signal waveforms used therein exceeds 100, although a lower limit of 30 may be specified before the basic principles of the invention are materially changed.

According to another aspect of the invention, the quasi-orthogonal (which are hereinafter defined as equivalent to "low-cross correlation") functions are derived from so-called maximal length binary shift register sequences.

According to yet another aspect of the invention, the waveform detection means associated with each particular subscriber, whose function is to be responsive, and only responsive, to the particular "address" signal waveform assigned to that subscriber, take the form of digital matched filters, per se well known to those skilled in the art.

To increase the effective WT product of the signal waveforms used according to the invention, and also to prevent the spurious actuation of a subscriber's waveform detection means as a result of being "swamped" by a powerful adjacent transmitter in fact transmitting a different signal waveform from that of the subscriber being "drowned out," the invention further proposes that subscribers place their transmitted signal waveforms in randomly varying portions of the frequency spectrum allocated for message information. In addition to preventing the "swamping" of a subscriber by a strong adjacent transmitter, this feature also considerably increases the already inherent, and very effective, anti-jam properties of the communication system.

According to yet another aspect of the invention, advantage is taken of the recognition that the initial calling procedure, that is, the time during which a calling subscriber acquires, and establishes a "link" with, a called subscriber, requires in general a much lower data rate than is required for the transmission of message information. Accordingly, a limited portion of the total available communications channel is provided for the transmission of auxiliary information, such as calling signals and supervisory signals, for example, synchronization signals when needed.

The foregoing and other objects, features and advantages of the invention will be apparent from the following more particular description of an exemplary embodiment of the invention, as illustrated in the accompanying drawings.

GENERAL STRUCTURE

Figure 1:
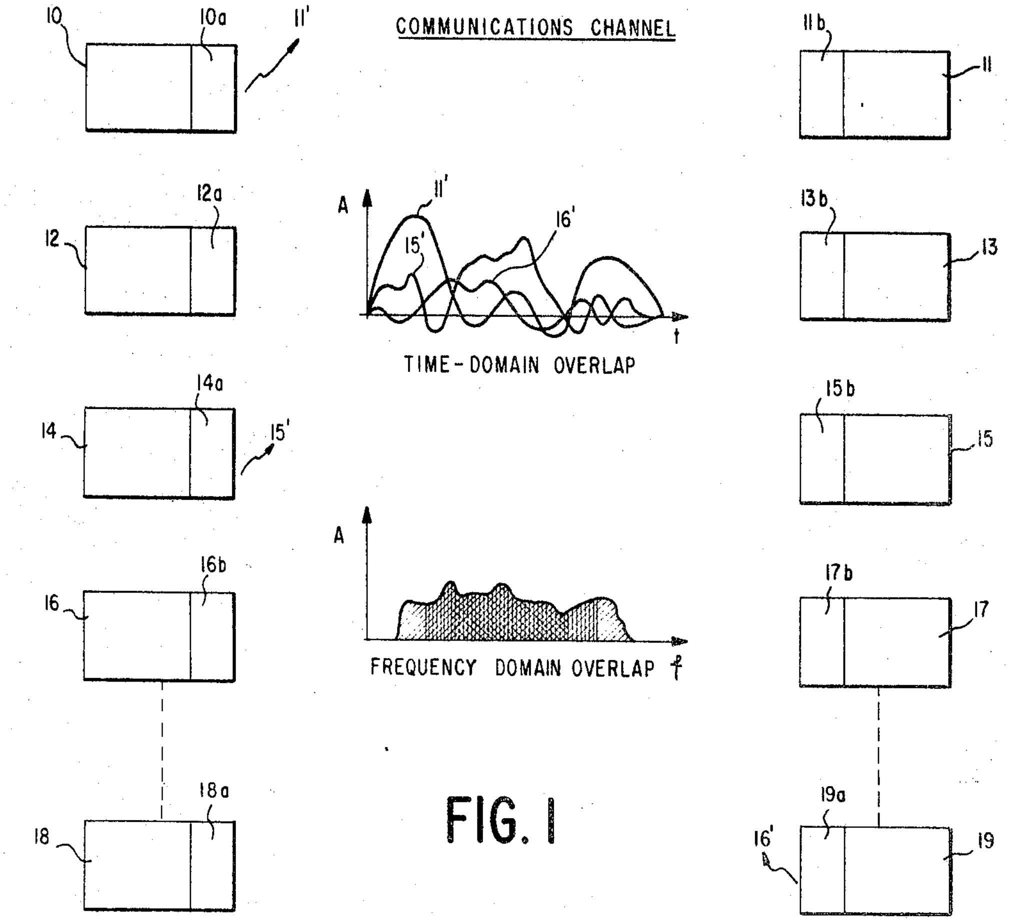
FIG. 1 is a functional diagram of the communication system according to the invention.

Referring now to FIG. 1, there is shown a broad symbolic system diagram of the invention. Each subscriber is represented symbolically by its particular transceiver 10–19, with each transceiver having a transmitting portion 10*a*, 12*a*, 14*a* . . . 18*a*, and a receiving portion 11*b*, 13*b*, 15*b* . . . 17*b*. For convenience, the transceivers 10, 12, 14 and 18 are shown only with their respective transmitting portions to indicate their illustrated mode of operation, while transceivers 11, 13 . . . 17, are illustrated only with their respective receiving portions 11*b*, 13*b* . . . 17*b*.

The communications channel between all of the subscribers is represented in terms of its two principal parameters, namely time, and frequency. Under the particular conditions shown in these two diagrams, the communications channel is being utilized by subscriber 10 transmitting to subscriber 11, subscriber 14 transmitting to subscriber 15, and subscriber 19 transmitting to subscriber 16. This is represented by the signals 11′, 15′ and 16′, which are shown as overlapping both in time, and in frequency. Each one of the signals 11′, 15′ and 16′ is uniquely assigned to that particular subscriber whose receiving portion 11*b*, 15*b*, and 16*b* is able to extract only its corresponding signal 11′, 15′ or 16′, from the complex mixture of signals existing in the communications channel.

Figure 2:
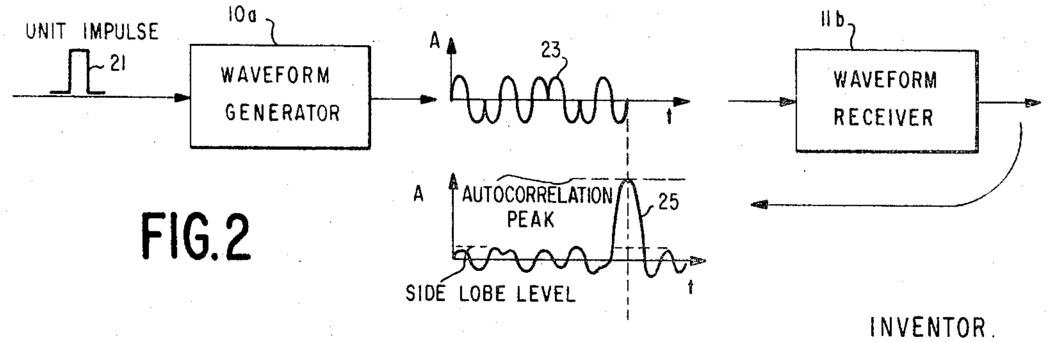
FIG. 2 is a functional diagram illustrating means for generating and detecting complex signal waveforms.

The properties of the signals 11′, 15′ and 16′ in terms of which message information is transmitted to the subscribers, will now be explained with reference to FIG. 2 which discloses apparatus capable of generating an address signal waveform.

A waveform generator 10*a*, to be more particularly described hereinafter, when actuated by a narrow width pulse 21, known as a unit impulse, proceeds to generate a complex wave 23 at the output thereof. The signal 23 is shown as a complex function of time, which for ease of explanation, is illustrated in terms of the phase reversal of a constant frequency signal. The pattern of phase reversals, of which only a limited number are shown, characterizes the signal 23, and the waveform generator 10*a* may be internally adjusted to generate any one of a plurality of signals 23, each with a unique and different pattern of phase reversals.

A waveform receiver 11*b*, hereinafter also referred to as a signal waveform detection means, or as a signal extractor, can be so constructed as to be "matched" to a particular signal such as signal 23. The output of a waveform receiver 11*b*, when it receives a signal to which it is matched, is also shown in FIG. 2 by the signal 25. As shown, the signal 25 varies randomly in a noise like fashion until the instant when the entire signal 23 has been received by waveform receiver 11*b*. At such an instant, the signal 25 rises sharply to a peak amplitude known as the auto-correlation peak, whereafter it again decays and varies in a noise like fashion about what is known as the side-lobe level. Only when the waveform receiver 11*b* is subjected to an input signal 23 to which it is matched, will it provide the auto correlation peak signal 25. In response to all other and different inputs, the waveform receiver 11*b* will always produce signals which do not vary appreciably above and below the side lobe level. A more detailed description of circuitry embodied within the waveform receiver 11*b*, and the manner in which it may be varied so as to be responsive to different signal waveforms, will be explained hereinafter.

The waveform receiver 11*b* will extract, that is, be responsive to, the particular signal to which it is matched even when such a signal is mixed with other and different signal waveforms assigned to other subscribers, and when such a signal waveform is deeply embedded in noise. In order to achieve this discriminability, that is, the ability of a waveform receiver 11*b* to discriminate its particular waveform from all other waveforms, certain conditions must be met by the signal waveform 23. One of the most desirable properties of these signal waveforms 23 is that they be far apart in a mean square sense, or, equivalently, that the mutual cross-correlation coefficient be low. The distance, or "apartness" of two functions is defined as:

$$d=\sqrt{2}[1-\frac{1}{ZWT}\sum_{i=1}^{i=2WT}x_iy_i)^{1/2}$$

where $\{x_i\}\{y_i\}$, $i=1, \ldots, 2WT$, are the sample points of two signal waveforms. The summation of the cross-product term $\{x_i\}\{y_i\}$ may be interpreted as the summation of the number of matches and mismatches of two signal waveforms observed over the same time period at a number of intervals, and it represents the cross-correlation coefficient of two signals. The cross-correlation coefficient of two truly orthogonal functions is zero, that is, the number of matches exactly equals the number of mismatches, and therefore $d$, in the above equation, is maximum; i.e. $d/\sqrt{2}$ equals one.

However, as previously mentioned, the number of orthogonal functions is limited and their generation is complex. For this reason, a slightly less ideal case is utilized according to the invention, and signal waveforms having a low (other than zero) cross-correlation function are utilized as the address signal waveform for each subscriber. It has been found that these signal waveforms can be specified as having a preferred distance, or apartness, as defined as follows:

$$0.75<\frac{d}{\sqrt{2}}<1$$

While the limits thus given define a preferred range of values for $d/\sqrt{2}$, the invention embraces a wide range for $d/\sqrt{2}$ as follows:

$$0.30<\frac{d}{\sqrt{2}}<1$$

For purposes of simplicity, time-varying address signal waveforms which meet the above definition will hereinafter be referred to as quasi-orthogonal signal waveforms.

In addition, the signal waveforms utilized in the invention (both their generation and detection, or extraction, will be described hereinafter) are further characterized by an additional, and independent, property, namely their WT product. This term is well known to those skilled in the art and, as previously mentioned, it indicates the complexity of the signal waveform which is used as the address of the particular subscriber. There is no upper limit on this figure but an acceptable lower limit to accommodate at least one thousand different subscribers for a communication system, requires a WT product of 128. That is, the product of the bandwidth of the signal waveform and its duration, must meet this figure. Lesser number of subscribers may be accommodated with WT products which range as low as 30, subject to the error rates deemed acceptable.

By the use of waveforms defined as above, a communication system according to the invention is provided which not only has the advantage previously mentioned but which also achieves as much as a ten-fold increase in the number of subscribers per bandwidth over even the best figure that prior art random-access communications systems have been able to meet.

Figure 3A:
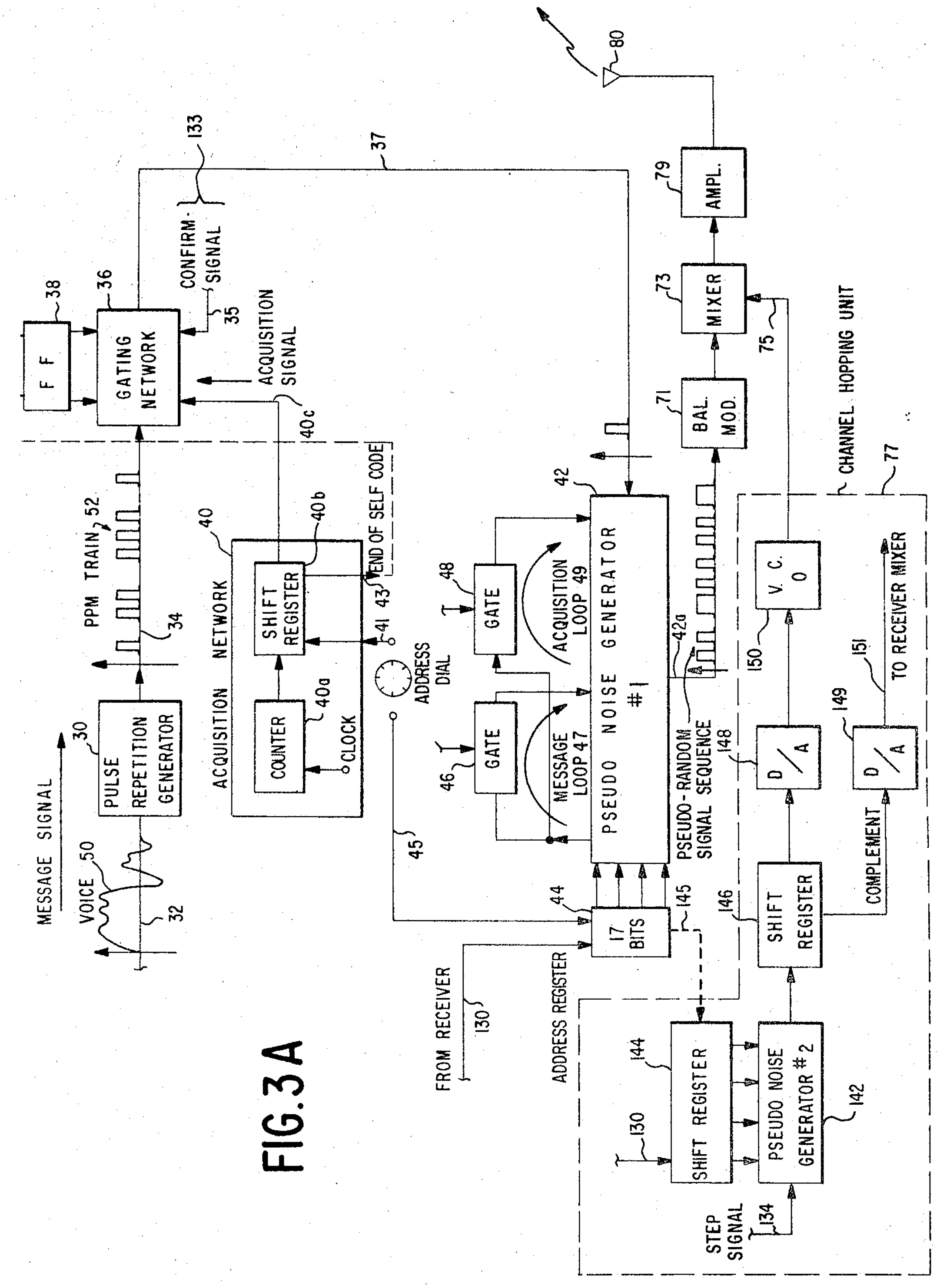
FIG. 3A is a more detailed block diagram of the transmitting portion of a subscriber's transceiver.

Referring now to FIG. 3A, there is shown the essentials of the transmitting portion 10A of a subscriber 10.

The embodiment of the invention will be described with reference to voice communications, although not limited thereto. To this end, a pulse repetition generator (hereinafter referred to as PRG) 30 accepts input signals via line 32, such as a voice signal 50. The voice signal 50 modulates PRG 30 and causes it to emit, on its output terminal 34, a string of (P)ulse (P)osition (M)odulated train of signals 51 which are applied to a gating network 36. When no voice signals are applied to PRG 30, it is internally inhibited to prevent the generation of any signals on its output terminal 34, so that no signals are generated which do not convey information. The gating network 36 is conventional in nature and it is controlled by a flip-flop 38 to pass either the message signal as represented by the PPM train 51, or an acquisition signal (to be hereinafter described) from acquisition network 40, to a pseudo-noise generator 42, hereinafter referred to as PNG 42, via a connection 37. PNG 42 converts, or encodes, the message signal or the acquisition signal, into the particular signal waveform assigned to a subscriber. PNG 42 is controlled by an address register 44 to generate the address signal waveform of a selected subscriber. Depending upon whether acquisition signals, or message signals, are to be transmitted to a subscriber, PNG 42 is further controlled to emit either a first signal waveform when gate 46 is conditioned to activate the message loop 47, or a second signal waveform, when gate 48 conditions a second, acquisition loop 49. The manner in which, and when, these loops are activated will be described hereinafter.

In operation, when a subscriber wishes to initiate communications with another subscriber, he begins by dialing the called party's address in terms of a 17 bit binary code, for example. This results in the extraction, from a suitable storage device (not shown), of a pattern of 17 bits which are entered into address register 44 via a connection 45. After the address (as represented by a 17 bit pattern) of a called subscriber has been entered into the address register 44 (which controls PNG 42 to generate the signal waveforms assigned only to the called subscriber), the acquisition network 40 receives a signal via line 41 to cause a counter 40A to actuate a shift register 40B. Shift register 40B stores a 17 bit binary pattern which represents the calling subscriber's address. The binary pattern from shift register 40B is applied to gating network 36, via a connection 40C. The gating network 36 is conditioned via a flip-flop 38, which is initially preset so as to condition gating network 36, to pass signals appearing on line 40C onto the PNG 42 via line 37.

During the acquisition (also referred to as the calling) mode, when a calling party attempts to initiate communications, gate 48 is initially conditioned to activate acquisition loop 49, which in turn controls PNG 42 to emit one of the two signal waveforms assigned to the particular called subscriber. During the first part of the calling mode, when a called party's address signal waveform is to be transmitted, gate 48 is conditioned and PNG 42 produces the called party's acquisition address signal waveform. After the called party's acquisition address waveform has been transmitted, the calling party must transmit its own address to identify himself. This information is transmitted to the called party in terms of a second address signal waveform, known as the message address waveform. To this end, gate 46 is now conditioned to activate the message loop 47 which controls PNG 42 to produce the message signal waveform assigned to the particular called subscriber.

After a calling party has transmitted (in a fashion to be described in more detail hereinafter) its own "address," so to speak, encoded in terms of the called party's address signal waveform (as selected by the address register 44 and the acquisition loop 47 controlling PNG 42) an "End Of Self-Code" signal is generated by shift register 40B on line 43. This signal, the appearance of which indicates that all of the bits defining the calling party's address have been discharged from shift register 40B, is applied to flip-flop 38 so that gating network 36 is now allowed to pass message information from PRG 30 to PNG 42.

Message information, as represented by the voice signal 50 appearing on line 32, modulates PRG 30 which provides on its output terminal 34 a train of PPM signals 51. The PPM train 51 passes through the gating network 36 and is applied to PNG 42 via line 37. Each signal in the PPM train 51 is encoded, or converted, by PNG 42 into a signal waveform assigned to the called subscriber. This waveform is shown on line 42A as a pseudo-random signal sequence generated in response to every message pulse applied to PNG 42 on line 37. A more detailed explanation of the generation of the pseudo-random signal sequences, which are really the address signal waveforms, will now be given.

*Generation of address signal waveforms*

Figure 4A:
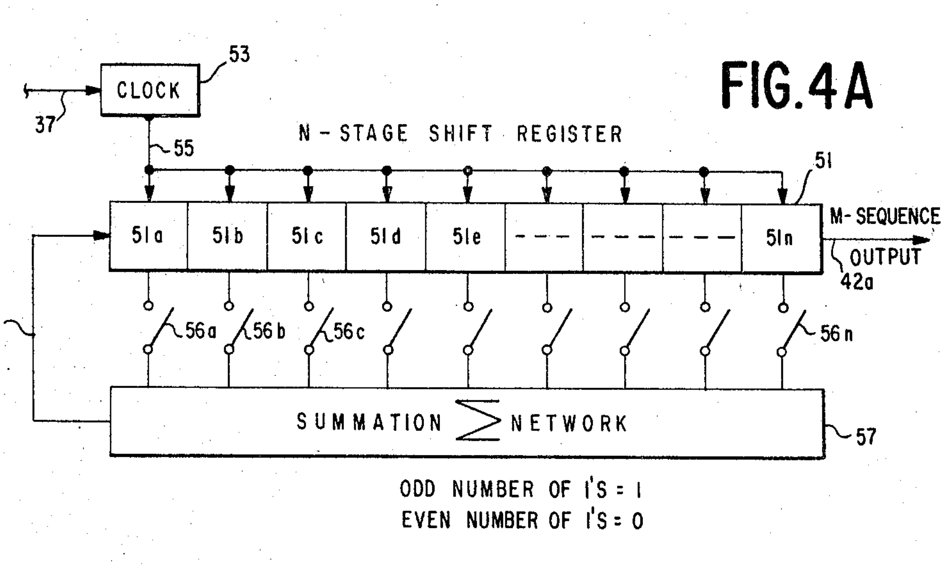
FIG. 4A is a simplified diagram of a portion of FIG. 3A.

Referring now to FIG. 4A, there is shown a multiple stage binary shift register 51. The *n*-stage shift register 51 is controlled by a clock 53 which applies clock pulses simultaneously to all stages of the shift register 51 via a line 55. Each signal from clock 53 will shift the bit pattern presently stored in register 51 one position to the right, which results in the appearance of a signal on the output line **42*a* for every signal from clock 53**.

Each of the stages **51*a*–51*n* of register 51 is connectable to a summation network 57 by a series of switches 56*a*–56*n*. The switches 56*a*–56*n* may be closed in a selected pattern so as to provide the summation network 57 with the output of selected ones of the stages 51*a*–51*n*. The result of summing a selected pattern of stages 51*a*–51*n* (as represented by the selective closure of switches 56*a*–56*n*) by the summing network 57, results in the "feedback" so to speak, of a bit from the output of summation network 57 to stage 51*a* of the shift register 51, via the connection 59. The summation network 57 may be of a conventional nature to generate either a binary zero or a one, on line 59, depending upon whether an odd number of binary ones, or an even number of binary ones, have been provided thereto on lines 56*a*–56*n***. Those skilled in the art will recognize that the structure shown in FIG. 4A represents a well-known, maximal-length binary shift register, capable of generating so-called *m*-sequences, which is a pseudo-random pattern of binary bits. That is, for a particular pattern of bits initially loaded into register 51, and for a particular set of closed switches **56*a*–56*n*, register 51** will generate a particular sequence, a so-called *m*-sequence, in response to the clock pulses applied to register 51 by the clock 53. Depending upon the number of stages in shift register 51, the number of bits which will be generated on line 42*a* in response to the clock pulses from clock 53, will be $2^n-1$ bits, before the shift register will start to repeat the original sequence. For an exemplary embodiment, if the number of stages is assumed to be 17, shift register 51 will generate a string of $2^{17}-1$ bits, in a random sequence, before the identical *m*-sequence is repeated.

Those skilled in the art will also recognize that the structure shown in FIG. 4A is capable of generating more than one *m*-sequence, according to the feedback pattern, that is, according to which ones of the switches 56*a*–56*n* are closed, to thereby provide the output of a corresponding shift register stage to the summation network 57. For each particular different setting of the switches 56*a*–56*n*, the shift register 51 will generate a maximal length sequence, or so-called *m*-sequence, in response to actuation by the clock 53.

Figure 4B:
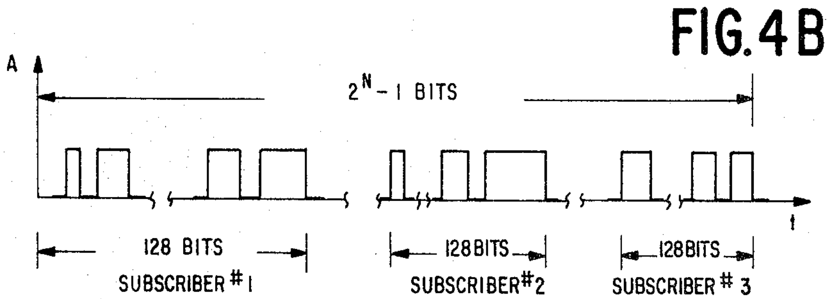
FIG. 4B is a diagram showing the allocation of quasi-orthogonal waveforms for different subscribers.

Referring now to FIG. 4B, the sequence of bits on the output 42*a* of shift register 51 has been represented, in a very compressed time scale, as a random sequence of $2^n-1$ bits. According to the invention, the signal address waveform for a particular subscriber is determined by allocating to each subscriber a portion of the *m*-sequence represented in FIG. 5B. For example, subscriber 1 may be assigned the first 128 bits of the *m*-sequence, subscriber 2 will be assigned the second portion of 128 bits, and subscriber 3 will be assigned a third portion of 128 bits. Each of these portions of the *m*-sequence are different from each and every other portion of the *m*-sequence depicted in FIG. 5B, and furthermore,, the cross-correlation function between any two portions of the same *m*-sequence is very low, almost zero. In other words, the portions of the *m*-sequence are quasi-orthogonal and they are also pseudo-random.

Returning now to FIG. 4A it is noted that a particular *m*-sequence is selected by closing a particular pattern of switches 56*a*–56*n*. The starting point in the *m*-sequence, that is, the point at which the shift register 51 begins to generate the sequence of signals on line 42*a*, is in turn controlled by the binary bit pattern initially loaded into the stages 51*a*–51*n* of the shift register 51.

A more detailed description of *m*-sequences, and their generation, as well as the proper feedback patterns (which would control the closure of switches 56*a*–56*n* of shift register 51) is found in Section 7.4 of "Error Correcting Codes" by W. W. Peterson, John Wiley and Sons, Inc., New York (1961).

Turning now to FIG. 3A, the interrelationship between FIG. 5A and FIG. 3A will be discussed. As mentioned, PNG 42 is controlled by the address register 44 to generate the pseudo-random signal sequence for a particular subscriber. The register 44 controls the starting point of the *m*-sequence generator (PNG 42) by loading shift register 51 with a selected pattern of bits, whereafter the PNG 42 proceeds to generate a first *m*-sequence when the acquisition loop 49 has selected a first feedback pattern for the shift register 51. As previously mentioned, this results in the generation of a first pseudo-random signal sequence on line 42*a* of PNG 42 which is uniquely assigned to one subscriber. For message communication between subscribers, PNG 42 is controlled to generate a second *m*-sequence when the message loop 47 is activated, to select a second feedback pattern in the shift register 51 of FIG. 4A.

*Encoding of message information in terms of address signal waveforms*

PNG 42 is responsive to the PPM train 52 (FIG. 3A) applied to the line 37, and it encodes the message information contained in PPM train 51 in terms of the address signal waveform assigned to a particular subscriber. (The subscriber, in turn is selected by the address register 44, as previously described.) For a more detailed understanding, reference is had to FIG. 5A which shows only two representative PPM signals 60 and 61 appearing on line 37. Each of the signals 60 and 61 has a width of *y* time units and the spacing, *x*, between them, is a function of the information which these signals 60 and 61 convey.

Each signal 60 and 61 is applied to PNG 42 via line 37 (FIG. 3A) and, as shown in more detail in FIG. 4A, to the clock 53. Each signal 60 and 61 functions to gate the clock 53 for a period sufficient to generate 128 clock pulses which results in the generation of a sesuence 60′ of 128 bits, as shown in FIG. 5B, on line 42*a* (FIG. 3A). FIG. 5C shows a second burst, or sequence 61′, of 128 bits generated by PNG 42 in response to the second information signal 61 (FIG. 5A). FIG. 5C is a continuation of FIG. 5B so that it can be seen that the sequence of bits 61′ is spaced from the sequence 60′ by the same distance *x* which indicates the spacing between the signals 60 and 61 applied to the input of PNG 42.

Thus, in summary, PNG 42 encodes each information signal 60, 61, in terms of a random sequence of bits 60′, 61′, which sequence is determined by the address register 44 (FIG. 3A, controlling PNG 42 to generate the particular portion of the m-sequence) and the loops 47 and 49 (FIG. 3A, controlling PNG 42 to generate one to two *m*-sequences).

*Transmission of address signal waveforms*

Returning to FIG. 3A, the output of PNG 42, on line 42*a*, is applied to a conventional, balanced modulator 71 which converts each pseudo-random signal sequence emanating from PNG 42 into a form suitable for transmission. The output of modulator 71 is applied to a conventional mixing circuit 73 in which the information output from modulator 71 is translated upwards into the frequency spectrum. Mixer 73 is controlled to place the output signal from modulator 71 in a portion of the frequency spectrum as determined by signals on line 75 emanating from a channel shifting unit, or hopping unit 77, to be described more in detail hereinafter. After the mixer 73 has translated the signal from modulator 71 to a selected portion of the frequency spectrum, it is passed through an amplifier 79 which drives a conventional electromagnetic antenna 80 which radiates the information out over the air.

It should be recalled that no signals are transmitted over the air when no voice signals are applied to PRG 30, since PRG 30 is then self-inhibited. This prevents the transmission of an unmodulated PPM train when a party is not talking, so that such a signal, which does not convey any information, does not clutter the communications channel.

Figures 5A, 5B, 5C, 5D, 5E:
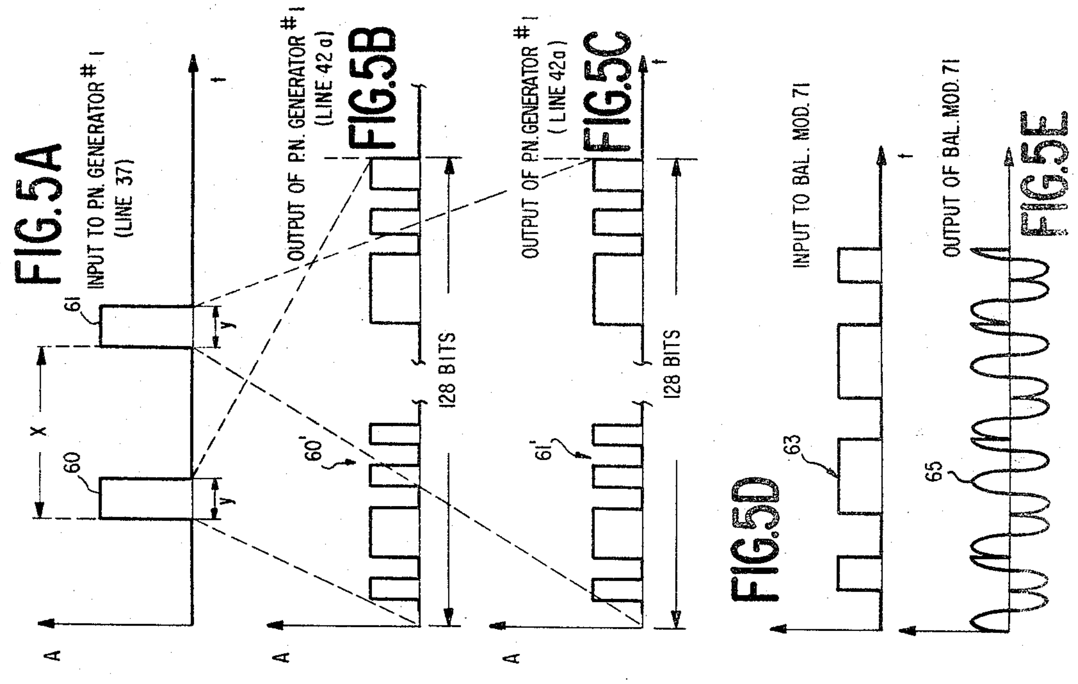
FIGS. 5A–5E are diagrams showing typical waveforms existing in the block diagram of FIG. 3A.

Typical waveforms representative of the input and output of the modulator 71 are shown in FIGS. 5D and 5E, wherein FIG. 5D shows a signal sequence 63 which is representative of a particular signal sequence generated by PNG 42. The output waveform 65 of balanced modulator 71 is a constant frequency signal whose pattern of phase reversals corresponds to the sequence of bits of signal 63. All the properties of the sequence 63, that is, its randomness, and its cross-correlation function, with other sequences, is entirely preserved and not changed by this conversion from a discontinuous sequence, such as 63, to a more or less continuous waveform, such as 65.

*Receiving portion of a subscriber's transceiver*

Before proceeding with a description of the structural embodiment of the receiving portion of the invention, it is deemed desirable to describe a particular species of the waveform receiver or waveform extractor 11*b* (FIG. 2) previously described. It has been found that one of the most suitable devices for detecting complex waveforms are so-called matched filters, well-known to those skilled in the art. Matched filters are basically of two types, analog matched filters and digital matched filters. The former type has some disadvantages which lead to the use of digital matched filters in the preferred embodiment of the invention.

Figures 6A, 6B, 6C, 6D, 6E:
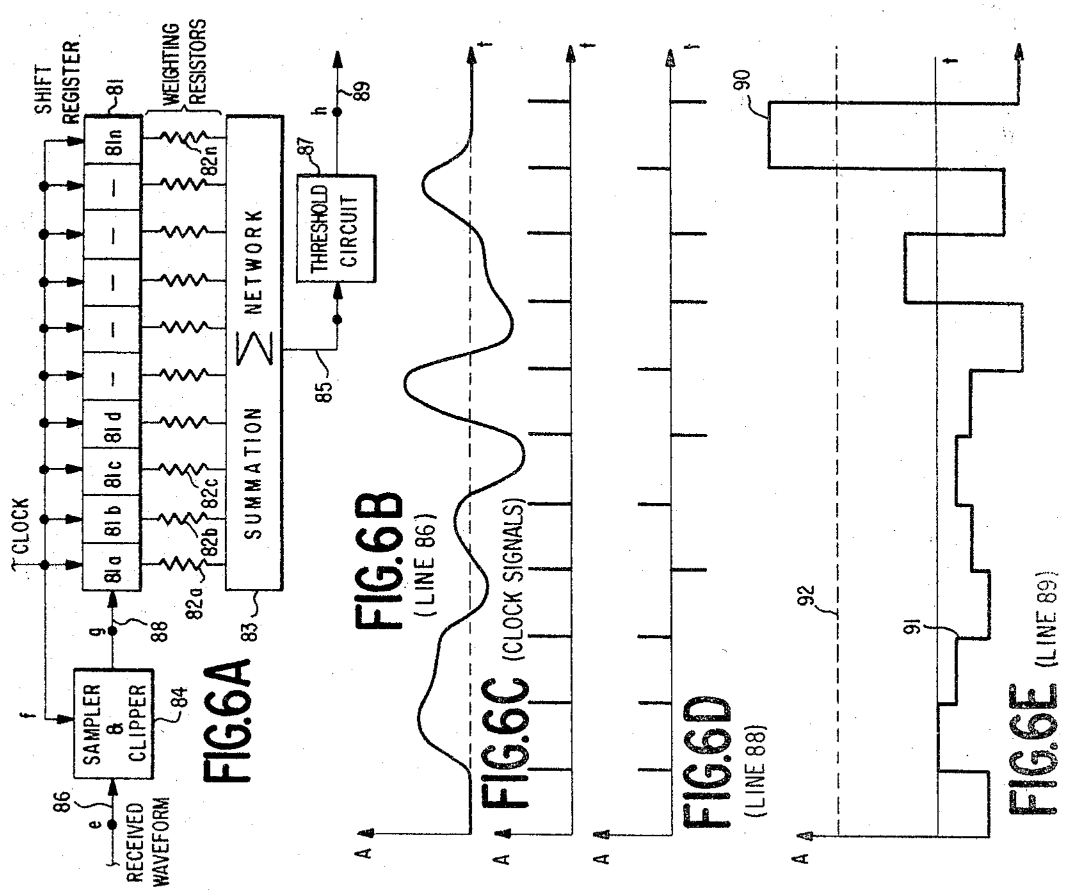
FIG. 6A is a simplified version of a digital matched filter.
FIGS. 6B–6E are diagrams showing typical waveforms occurring at various points in the circuit of FIG. 6A.

FIG. 6A discloses a digital matched filter which comprises a shift register 81 having a plurality of stages 81*a*–81*n*. The output of each shift register stags 81*a*–81*n* is fed to an analog summation network 83 through a series of weighting resistors 82*a*–82*n*. The summation network 83 provides a linear sum of all the voltages appearing across the weighting resistors 82*a*–82*n* and produces an output signal on line 85 which is applied to a conventional threshold circuit 87. The output of the threshold circuit 87 is provided on line 89 and represents the composite output of the digital matched filter.

The input to the digital matched filter is provided through a conventional sampler and clipper 84 which takes a received signal waveform on line 86 and applies it to the shift register 81 via line 88. A source of clock pulses applies signals simultaneously to both the sampler and clipper 84 and to all of the stages 81*a*–81*n* on the shift register 81.

The operational response of the digital matched filter, shown in FIG. 6A, to a signal waveform to which it is matched, can be explained in terms of FIGS. 6B–6E which show typical and representative signal conditions at various points in the circuit of FIG. 6A.

The complex waveform shown in FIG. 6B appears on line 86 as the input to the sampler and clipper 84. The clock signals applied to sampler and clipper 84 are shown in FIG. 6C. FIG. 6D represents the output signals on line 88 which are applied to the shift register 81 as a series of positive and negative spikes. FIG. 6E represents the output of the matched filter and it is noted that if the received waveform is one to which the digital matched filter is matched, a sharp peak 90 (FIG. 6E) is developed on the output line 89 (FIG. 6A) of the digital matched filter, when the complete received waveform (FIG. 6B) has been received. It is noted that only the waveform to which the digital matched filter is matched will cause such a response on the output terminal thereof; no other signal will generate such a peak and the output of the digital matched filter on line 89 (FIG. 6A) will resemble a series of noise spikes never rising above the threshold 92 (FIG. 6E) set by the threshold circuit 87 (FIG. 6A).

A more detailed description of the theory and operation of matched filters is given in an article "An Introduction to Matched Filters," by George L. Turin, in the IRE Transactions on Information Theory, June 1960, p. 311.

Figures 3B, 3D:
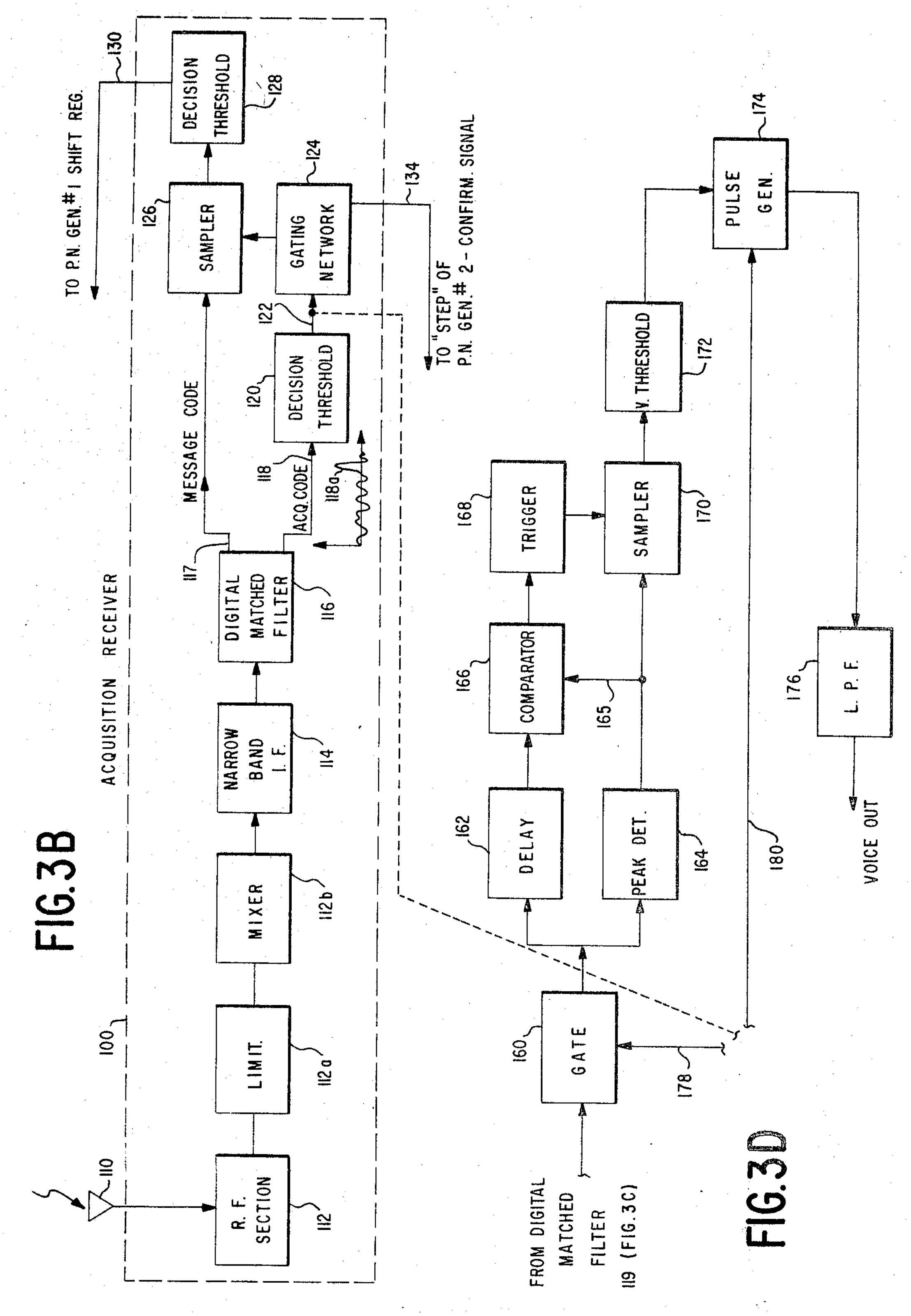
FIG. 3B is a partial block diagram of the receiving portion of a subscriber's transceiver.
FIG. 3D is a block diagram of an alternative embodiment of FIG. 3C for the receiving portion of a subscriber's transceiver.
Figure 3C:
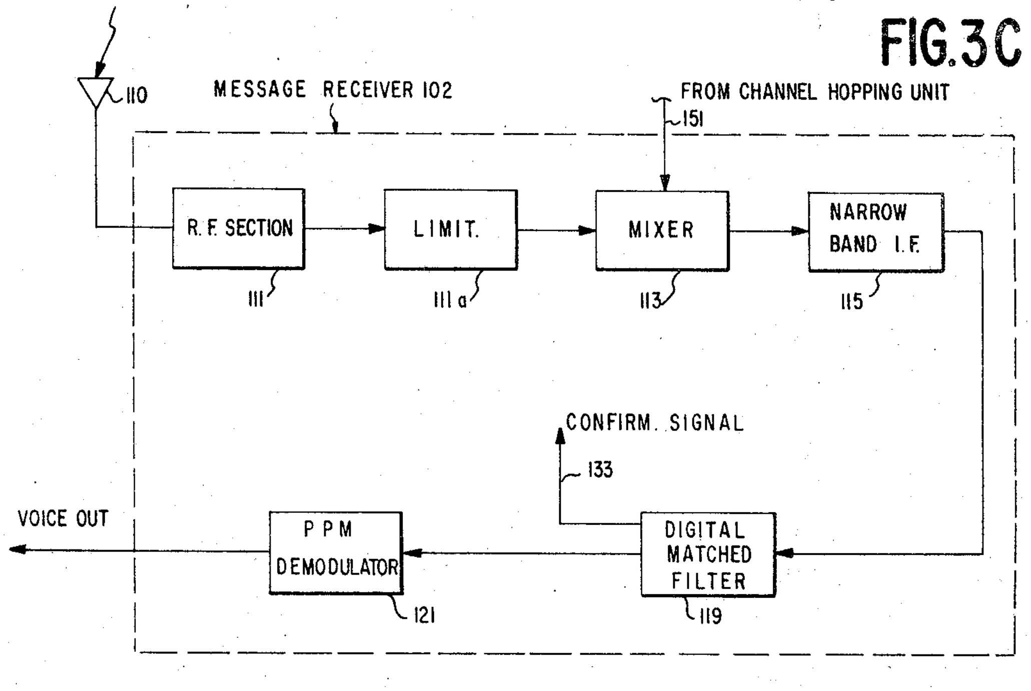
FIG. 3C is a partial block diagram of additional circuitry in the receiving portion of a subscriber's transceiver.

Turning now to FIGS. 3B and 3C, there is shown an acquisition receiver 100, and a message receiver 102, each of which are present in the receiving portion of the transceiver of a particular subscriber. The acquisition receiver 100 detects information other than message information, such as acquisition information and supervisory information, while the message receiver 102 (FIG. 3C) detects actual message information. The acquisition receiver 100 will be discussed first.

Acquisition receiver 100 comprises a receiving antenna 110 which feeds signals to a conventional R-F section 112, which thereafter provides its output limiting circuit 112*a* feeding a mixer 112*b* which precedes a narrow band I.F. section 114. This results in the acquisition of signals received by antenna 110 in a conventional manner familiar to those skilled in the art. It is however to be noted that the ability to use limiters depends on the fact that it is the phase, and not the amplitude, of the received signals which conveys the information. The output of I.F. section 114 is provided to a digital matched filter 116 which is responsive to both signals received in terms of the message code, and the acquisition code of the particular subscriber. The output of digital matched filter 116 is provided on two lines 117 and 118. When the digital matched filter responds to signals received in the message code, appropriate signals will be emitted on line 117, while signals received in the acquisition code will cause the digital matched filter 116 to generate signals on line 118.

In terms of a temporal sequence, the digital matched filter 116 will normally receive signals in the acquisition code before it receives signals in the message code. Signals generated on line 118 are provided to a decision threshold circuit 120 which only issues an output signal on line 122 when signals generated on line 118 have exceeded a minimum threshold level. (This prevents the decision threshold circuit 120 from falsely generating signals on line 122 when, in fact, no such signals, but only noise signals, have been received by the digital matched filter 116.) The output signal on line 122 controls a gating network 124 which, inter alia, controls a sampling circuit 126 for sampling message code signals received subsequently to the acquisition code signals. Sampler 126 samples signals appearing on line 117, and provides samples to a decision threshold circuit 128 which, in turn makes a final decision about the signals received on line 117. The result of these decisions is provided by the circuit 128 on line 130, which in turn is applied to the PNG 42 address register 44, for reasons to be explained hereinafter.

The output of gating network 124 is also provided, via line 134, to the channel hopping unit 77 of the transmitting portion of a subscriber's transceiver. This will be discussed more in detail when the channel hopping unit is considered.

Turning now to FIG. 3C, a message receiver 102 is also provided for each subscriber, in addition to the acquisition receiver 100. Message receiver 102 is in many respects similar to acquisition receiver 100 since it also has a conventional R-F section 111, a limiting circuit 111*a*, a conventional narrow band I.F. section 115, a digital matched filter 119, and a conventional PPM demodulator 121. Additionally, message receiver 102 includes a mixer 113 which is controlled by signals from a channel hopping unit 77 of a subscriber so as to properly recover the transmitted signals which are placed in various portions of the communications channel, in a manner to be described.

GENERAL OPERATION

The subsequent description of the operation of FIGS. 3A–3C will be described in terms of a calling party, and a called party.

*Calling party's transceiver*

Turning now to FIG. 3A, a calling party initiates a calling procedure by dialing the address of the desired called party. This results in the storage, in address register 44, of a binary bit pattern which sets PNG 42 to the called party's address signal waveform. During this initial procedure, gate 48 is conditioned and gate 46 is not, so that the acquisition loop 49 is in the circuit of PNG 42 and causes it to generate the acquisition signal address waveform of the called subscriber. The acquisition signal address waveform of the called subscriber is passed through the balanced modulator 71 and is thereafter provided to a mixer 73 which is controlled by line 75 to place the acquisition signal address waveform of the called subscriber in a unique portion of the frequency spectrum hereinafter called the switchboard band, as will be explained in more detail hereinafter.

After PNG 42 has generated the number of bits to specify the called subscriber's acquisition signal address waveform (for example, in the embodiment of this invention, 128 bits), a counter (not shown), emits a signal which causes the removal of the conditioning signal from gate 48 (thereby inhibiting it) and the conditioning of gate 46 to now place PNG 42 in a condition to generate the called subscriber's message signal waveform. At the same time that gate 46 is opened, the shift register 40*b*, in acquisition network 40, is caused to discharge its stored contents (which represents the address of the calling party) onto line 43 for transmission to the called subscriber, so that the called subscriber can identify who the calling party is. The sequence of signals which appears on line 40c, and which represents the calling party's address in terms of a binary code, is passed through the gating network 36, which is conditioned to pass the acquisition signals by means of flip-flop 38 preset to the acquisition mode. Thus, the binary bit pattern which represents the calling party's address, is applied, via line 37, to PNG 42 which encodes the calling party's address pattern, in terms of the message signal waveform of the called subscriber. The transmission of the calling party's address in terms of the called party's message signal waveform occurs in the previously mentioned switchboard band.

After the shift register 40b has discharged its stored pattern, and "End Of Self Code" signal is generated on line 43 which is applied to flip-flop 38 to cause it to now condition gating network 36 to pass any message information that may appear on line 32, for example voice signals 50. However, before actual message transmissions may occur, an additional confirmation signal must be applied to gating network 36, via line 35 to indicate that the called subscriber has confirmed the reception of its address and is ready to receive message information. This confirmation signal is generated by the called subscriber in a manner which will be described below.

*Called party's receiver*

Turning now to FIG. 3B and the acquisition receiver 100 of a called subscriber, the preceding, described sequence of events will cause the following operation at the acquisition receiver 100. The signals transmitted by a calling subscriber are received by the called party's antenna 110 and passed through the R-F section 112 which is tuned to the switchboard channel of the communications channel. Thereafter the signal is passed through a limiting circuit 112a (to remove undesired amplitude variations) and thereafter into a narrow band I.F. section which provides signals to a digital matched filter 116. The filter 116, in response to the reception of its address signal waveform in the acquisition code, proceeds to generate a signal 118a on line 118 which is passed through a decision threshold circuit 120 which makes a decision if the signal on line 118 exceeds a predetermined level. In the case where digital matched filter 116 has received the waveform to which it is matched, namely its address in the acquisition code, decision threshold circuit 120 generates a signal on line 122 which is applied to gating network 124 and causes it to activate the sampler circuit 126.

The next signal which was transmitted by the calling party (subsequent to the called party's address) was its own address in terms of the called party's message code. Filter 116 now responds on line 117, the message code line, and generates a signal each time that the message waveform has been received. The sampler circuit 126 samples each of the signals generated on line 117 and supplies the sampled values to a decision threshold circuit 128 which reconstructs the received version of the calling party's address in terms of a binary bit pattern. This binary bit pattern is, in turn, loaded into the address register 44 of the called party's transceiver. It is also noted that the confirmation signal to be transmitted by a called subscriber after it has received its address signal waveform, is derived from a delayed version of the signal on line 122, and it appears on line 134. The signal on line 134 is applied to circuitry embodied within the channel hopping unit 77 to be described hereinafter.

As the called party has now received the calling party's address and has loaded it into the address register 44 (FIG. 3A) of its transmitting portion, the confirmation signal derived from the signal on line 122 (and appearing on line 134) of its acquisition receiver 100, is applied to PNG 42 and encoded in terms of the calling party's acquisition. Transmission of the confirmation signal occurs in the previously described manner except that the transmission of the confirmation signal now occurs in a message band, for which the mixer 73 of the called party is suitably controlled by a signal on line 75.

At the calling party's message receiver 102 (FIG. 3C) the confirmation signal transmitted by the called party is received by the R-F section 111 and passed through a mixer 113 which is controlled in a manner to be described. Thereafter the narrow band I.F. section 115 applies the received narrow band signal to the digital matched filter 119 which decodes the received confirmation signal and generates an output signal on line 133. This confirmation signal, generated on line 133 of the calling party's digital matched filter 119 is applied to the calling party's gating network 36 (FIG. 3A) to open the gating network 36 to pass message information appearing on line 34. Thereafter, each element of message information is encoded by the calling party's PNG 42 in terms of the message signal address waveform of the called subscriber.

Message information received by the called party's message receiver 102 (FIG. 3C) is passed through an R-F section and subsequent circuitry, to the digital matched filter 119, whereupon it is decoded and applied to a conventional PPM demodulator 121 which reconstructs the voice signal 50 (FIG. 3A) transmitted by the calling party.

*Channel hopping unit 77*

Turning now to FIG. 3A, it is seen that a channel hopping unit 77 controls the transmitting mixer 73 of a subscriber by signals on line 75. As also previously mentioned, signals containing information other than message information, for example signals carrying only the calling party's address, are transmitted in a switchboard channel, that is a unique portion of the frequency spectrum of the communications channel. However, once message information is to be transmitted, the channel hopping unit 77 controls mixer 73 to transmit all message signals in randomly varying channels within the broad message channel. For this reason, a pseudo-noise generator 142 (hereinafter refered to as PNG 142) is controlled to issue a random sequence of signals which are applied to a shift register 146 whose storage capacity may be 3 bits, for example. The contents of shift register 146, which are continually changed by PNG 142, are converted in a conventional digital to analog converter 148 and control a voltage controlled oscillator 150 which, in turn, provides the variable frequency mixing signals on line 75 to the mixer 73 of the transmitting portion of a subscriber.

Shift register 146 also supplies a second digital to analog converter 149 with the complement of the bit pattern supplied to digital to analog converter 148 so that the output of digital to analog converter 149, on line 151, undergoes a series of variations which is the complement of those at the output terminal of digital to analog converter 148. The variations on line 151, are applied to a second voltage controlled oscillator (not shown) which thereafter controls the mixer 113 of the message receiver 102 (FIG. 3C). One important reason for controlling the same subscriber's transmitting and receiving mixers in a complementary manner is to assure that a particular subscriber will not transmit, and receive, on the same band, which might result in "self-swamping."

Figure 7A:
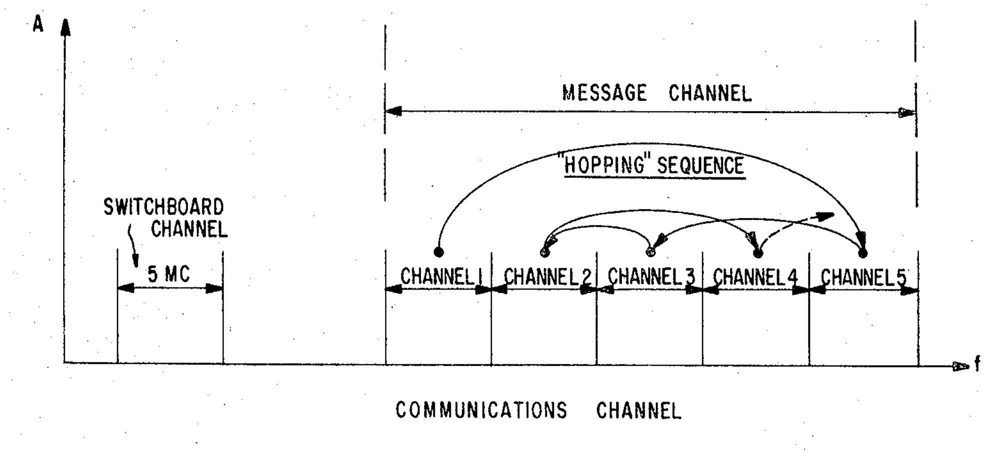
FIGS. 7A–7B are diagrams illustrating the frequency hopping technique of the invention.

To understand the operation of the channel hopping unit 77 in terms of a calling and a called subscriber, a description of its operation will now be given. When a calling party initially attempts a calling procedure, its own address is loaded into the calling subscriber's shift register 144. This, in turn, controls the starting point of a particular *m*-sequence for the generation of which PNG 142 is constructed. Before the calling party will activate PNG 142 to cause it to control the hopping of transmitted messages, the calling subscriber's PNG 142 must first receive a step signal on line 134. In such a case, the calling subscriber's step signal, to PNG 142 is derived from the calling party's reception of a confirmation signal (emanating from the called party) as generated by the matched filter 119 in its message receiver 102 (FIG. 3C). Thereafter, PNG 142 of the calling subscriber will cause the transmitted message signals from the calling subscriber to hop around a number of channels, for example 5 channels, such as shown in FIG. 7A, wherein the message channel is subdivided into 5 subchannels, with the hopping sequence denoted. FIG. 7A also shows a portion of the frequency spectrum set aside for the transmission of so-called switchboard signals, such as address information, or synchronization information, when needed.

In order to understand the hopping procedure which both a calling and a called party are subjected to by their respective channel hopping units 77 it must be realized that the calling party's transmitter and the called party's receiver must hop together, and that the calling party's receiver and the called party's transmitter must also hop together. Therefore, it is an established rule, when frequency hopping operations are initiated, that both the calling and the called parties will hop on a code as determined by the calling party's address. As previously described, the acquisition procedure furnishes the called party with the calling party's address and this address is loaded into the shift register 144 of the channel hopping unit 77 of both the calling and the called parties. (The calling party loads register 144 with his own address pattern, via line 145, while the called party loads its register 144 with the received version of the calling party's address via line 130.) The only difference between the calling and the called party's channel hopping unit 77 is that at the calling party, the voltage controlled oscillator 150 is controlled with the direct output of shift register 146 (via digital to analog converter 148). At the called party, the voltage controlled oscillator 150 for its transmitting portion is controlled by the complementary output from shift register 146, as generated on line 151, via the digital to analog converter 149.

It follows that the calling party's receiver is thus controlled in the same fashion as the called party's transmitter.

Figure 7B:
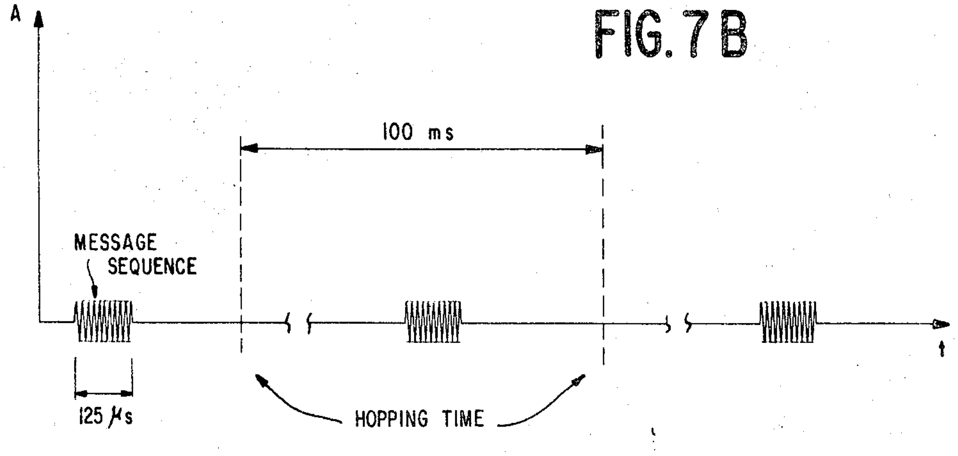

Referring now to FIG. 7B, it is seen that PNG 142 loads one new bit into shift register 146 on the order of, say 1 every 100 milliseconds so that the interval between hops is of this magnitude. Comparing this magnitude with the time normally occupied by the transmission of a signal waveform, it is seen that the latter, on the order of say, 125 microseconds, is far smaller, so that the hopping sequences at the transmitter and at the receiver need never be simultaneously initiated. In other words, there is a very small probability that a channel hop will occur during the actual transmission of an address signal waveform of a subscriber, so that absolute time synchronization between successive frequency "hops" is not needed. In the event that a "hop" should occur during the transmission of a signal waveform, an error will result, but the receiving party will merely ask for repetition of the erroneously received signal.

It is further noted with respect to FIG. 7B, that the information conveying signal waveforms are spaced in time, i.e., there are gaps during which no message elements are transmitted. This feature of the system further adds to the anti-jam properties since jamming will only have destructive effects when such occurs directly during the transmission of each and every message element.

OTHER MODIFICATIONS

While the invention has been described with respect to an exemplary embodiment thereof, those skilled in the art will recognize that a number of modifications are possible without changing the invention. For example, while the signal waveform generation according to the disclosed embodiment of the invention has been achieved by allocating to each subscriber different portions of at least two different *m*-sequences, it should be recognized that other address signal waveform generation schemes are also possible. For example, it makes no material difference to the principle of the invention if the addresses of subscribers are generated by forming them from the same corresponding portion of an entire class of different *m*-sequences.

Further, the invention has been described with reference to an embodiment that is asynchronous, i.e., one that does not require time synchronization between the subscribers. While synchronous operations are not normally needed, it may in some instances be desirable to provide this as a feature of the system. Those skilled in the art will recognize this would only involve some extra, but other wise conventional, logic circuitry at the transmitting portion of each subscriber's transceiver which would insert a signal encoded in terms of the acquisition code of the called subscriber at prescribed intervals of time. This can be achieved with entirely conventional techniques.

Furthermore, for communications over a very noisy communications channel, it may be advantageous to use a species of synchronous demodulation in order to discriminate against the continual noise existing in the communications channel. All that is needed in such a case is to provide synchronous demodulation circuitry at the receiving portion of each subscriber essentially as shown in FIG. 3D.

Briefly, FIG. 3D comprises a gate 160 which functions to pass signals from the message receiver 102 (FIG. 3C) of a subscriber. Any signals which the gate 160 passes are applied to a delay circuit 162 and a peak detector 164. The delay circuit 162 delays any signals passed by gate 160 for the maximum possible time that one signal element can be spaced from another signal element, according to the PPM scale utilized at the transmitter. The peak detector 164 in turn detects the peak amplitude of any signals passed by gate 160 and applies this peak amplitude via line 165 to the comparator 166, which also receives the delayed version of the signals passed by gate 160. Comparator 166 issues an output signal to a conventional trigger circuit 168 when the peak amplitude of the signal delayed by delay circuit 162 matches that of the output of the peak detector 164, as produced on line 165. The output of comparator 166 causes trigger circuit 168 to control a sampling circuit 170 to pass the peak amplitude stored in peak detector 164 to a variable threshold circuit 172 by which an arbitrary decision level can be established by each subscriber. The output, if any, of threshold circuit 172 is applied to a pulse generator 174 whose function is to generate a uniform pulse for every time that the threshold circuit 172 produces an output signal. The uniform output pulses from pulse generator 174, whose occurrence will be a function of the signals from the digital matched filter, therefore, representative of the PPM information transmitted by a transmitter, are applied to a standard low pass filter 176 in order to recover the voice signals which the PPM train represents.

It is to be noted that the gate 160 and the pulse generator 174 are conditioned to perform their respective functions, that is, to gate signals from the digital matched filter, and to produce output pulses as a function of signals having exceeded the threshold of threshold circuit 172, only when they are conditioned by a signal on lines 178 and 180. This conditioning signal will be derived from the acquisition receiver 100 (FIG. 3B) of a subscriber, more particularly the output of the decision threshold circuit 120 thereof. If, as mentioned above, a transmitter periodically inserts synchronization signals in the acquisition code of the called subscriber in the transmitted signals, the digital matched filter 116 will detect these signals and cause decision threshold circuit 120 to produce corresponding signals on line 122 indicative of the reception of a synchronization signal.

It is to be noted that the above-described system of demodulation, while termed synchronous, does not require absolute synchronism between the transmitter and the receiver. All that is required, and all that is accomplished by the circuitry shown in FIG. 3D, is that the gate 160 passes signals from the digital matched filter 119 (FIG. 3C) to the synchronous demodulator somewhere during the time interval during which a message signal is expected. Thus, the demodulation circuitry of FIG. 3D might be aptly called quasi-synchronous since absolute and accurate synchronization is not required.

While the invention has thus been particularly shown and described with reference to a preferred embodiment thereof, it will be understood by those skilled in the art that the foregoing and other changes in form and details may be made therein without departing from the spirit and scope of the invention.

What is claimed is:

1. A multiple-subscribed, random-access communication system, wherein each subscriber is asigned a quasi-orthogonal, pseudo-random, signal waveform, comprising:

a plurality of transceivers, one for each subscriber, each transceiver including at least one pseudo-random signal waveform recognition device responsive only to the pseudo-random sequence of signals which identify the portion of an *m*-sequence allocated to said transceiver associated with said subscriber; and means at each transceiver for asynchronously encoding any message destined for one of said subscribers in terms of a portion of said *m*-sequence to which the signal recognition device at that subscriber is responsive.

2. Apparatus according to claim 1 wherein said pseudo-random signals have as a measure of their nearness to orthogonality a distance, *d*, ranging below the true orthogonality condition at which $d\sqrt{2}$ as follows:

$$0.75<\frac{d}{\sqrt{2}}<1$$

3. In a multiple-subscribed, random-access communication system in which communications between any two or more subscribers are effected by the encoding of each elemental message portion in terms of quasi-orthogonal, pseudo-random, signal waveforms uniquely allocated to each of said subscribers, the combination comprising:

a plurality of transceivers, one for each subscriber, each transceiver having a transmitting and a receiving portion;

said transmitting portion including:

generating means for generating at least one pseudo-random *m*-sequence;

means for causing said generating means to generate a sequence of signals corresponding to only a portion of said *m*-sequence, once for each time that a message element is to be transmitted;

means for controlling said generating means to generate a different portion of said *m*-sequence for each different subscriber, whereby a particular subscriber is addressed by the transmission of only the portion of said *m*-sequence allocated to it; and means for transmitting said sequence of signals; and receiver means including:

a waveform receiver matched only to the pseudo-random sequence of signals which identify the portion of said *m*-sequence allocated to said transceiver associated with the particular subscriber.

4. Apparatus according to claim 3 in which said waveform receiver is a matched filter.

5. Apparatus according to claim 4 in which said matched filter is a digital matched filter.

6. In a multiple-subscriber, random-access communication system, wherein each subscriber is uniquely assigned at least two different quasi-orthogonal waveforms, one waveform for carrying message information, and the other carrying synchronization information, the combination comprising:

a plurality of transceivers, one for each subscriber, with each transceiver having a transmitting and a receiving portion, each transmitting portion including:

a pseudo-random noise generator for generating quasi-orthogonal signal sequences;

modulation means for controlling said noise generator to repetitively produce pseudo-random signal sequences in accordance with the message information to be transmitted;

first control means for controlling said noise generator to generate a first or a second pseudo-random sequence, said first and said second pseudo-random sequences being quasi-orthogonal;

second control means for selecting a particular initial point of the pseudo-random signal sequence selected by said first control means, whereby said noise generator produces a particular pseudo-random signal sequence according to whether synchronization or message information is to be transmitted, said particular signal sequence being initiated at a point according to a selected subscriber for whom the message is intended; and each receiving portion including:

first and second waveform detection means, one matched to a first pseudo-random signal sequence, the other being matched to a second pseudo-random signal sequence; and demodulation means responsive to both of said first and second waveform detection means for demodulating both synchronization and message information generated by the waveform detection means at the transceiver uniquely assigned to said pseudo-random signal sequences.

7. Apparatus according to claim 6 wherein said first and second signal waveform detection means are digital matched filters.

8. Apparatus according to claim 6 wherein said pseudo-random noise generator comprises an *m*-sequence generator.

9. Apparatus according to claim 6 wherein said pseudo-random signal sequences have a bandwidth W, the period T, and exhibit a WT product which exceeds 30.

10. A multiple-subscriber, random-access communication system, wherein each subscriber has a unique address in terms of a pseudo-random signal waveform, and wherein conversation between subscribers is effected over a communication channel by the encoding, and transmission, of each message element in terms of the pseudo-random signal waveform assigned to each particular subscriber, the combination comprising:

a plurality of transceivers, one for each subscriber, each transceiver having a transmitting portion, with each transmitting portion including:

a pseudo-random waveform generator adapted to generate each of the pseudo-random signal waveforms assigned to all the subscribers;

means for controlling said waveform generator in accordance with the information to be transmitted to a particular subscriber, whereby the output of said waveform generator is an information carrying sequence of pseudo-random signal waveforms;

means for transmitting said information carrying sequence of pseudo-random signal waveforms in a portion of the frequency spectrum of said communications channel, whereby the resultant transmitted signal is placed in a particular portion of the frequency spectrum; and hopping means for varying said transmitting means in a pseudo-random manner, whereby said resultant transmitted signal is caused to hop around in the frequency spectrum of said communication channel in a pseudo-random manner.

11. Apparatus according to claim 10, wherein said hopping means comprise a pseudo-random sequence generator.

12. Apparatus according to claim 11, wherein said pseudo-random sequence generator is an *m*-sequence generator.

13. Apparatus according to claim 12 further including means for controlling the starting point of the *m*-sequence.

14. In a multiple-subscriber, random-access communication system in which communications between any two or more subscribers is effected by the encoding of each elemental message element in terms of quasi-orthogonal signal waveforms uniquely assigned to each of said subscribers, the combination comprising:

a transceiver, one for each subscriber, each transceiver having a transmitting and a receiving portion, said transmitting portion including:

a quasi-orthogonal waveform generator adapted to generate each of the quasi-orthogonal signal waveforms assigned to the subscribers;

means for controlling said waveform generator in accordance with the information to be transmitted to a particular subscriber, whereby the output of said waveform generator is an information carrying series of waveforms;

means for transmitting said information carrying series of waveforms, said means including mixing means for placing the transmitted signal in a defined portion of the frequency spectrum of the communication channel; and hopping means controlling said last-mentioned means for varying the frequency spectrum location of the transmitted signal in a pseudo-random manner;

said receiving portion including signal waveform detection means matched so as to be responsive to the quasi-orthogonal signal waveform uniquely assigned to the particular subscriber associated therewith;

means for controlling said signal waveform detection means to be responsive to selected portions of the frequency spectrum of the communications channel; and means for varying said last-named means in a pseudo-random manner, said pseudo-random manner being different from the pseudo-random manner in which said hopping means control the placing of any signals transmitted by said transmitting portion.

15. Apparatus according to claim 14 further including:

means for deriving the pseudo-random manner in which said receiving signal waveform detection means is controlled, from the pseudo-random sequence in which said transmitting is controlled.

16. A multiple-subscriber, random-access communications system, in which message communications between subscribers is effected by the transmission of pseudo-random signal sequences uniquely assigned to each subscriber, and wherein a communication link between two subscribers is initially established during a call procedure by the transmission of a pseudo-random signal sequence representing the called subscriber's address, comprising:

a plurality of transceivers, one for each subscriber, each transceiver having a transmitting portion, said transmitting portion including:

a pulse repetition rate generator;

means for modulating said pulse repetition rate generator in accordance with the message information to be transmitted to a called subscriber, said modulating means having an output;

a pseudo-random noise generator responsible to the output of said modulating means for generating a pseudo-random sequence of signals;

means for controlling said noise generator to emit either a first, or a second, pseudo-random signal sequence according to whether message or synchronization information is to be transmitted, said means controlling said noise generator to emit said second synchronization pseudo-random signal sequence during a calling procedure;

means for transmitting the message information carrying pseudo-random signal sequences from said noise generator in selected portions of the frequency spectrum of the communications channel;

means for controlling said transmitting means during a calling procedure to transmit signals only in one unique portion of the frequency spectrum of the communications channel, said unique portion being different from the portions of the frequency spectrum in which message signals are transmitted; and frequency hopping means for controlling said transmitting means to cause the transmission of message information carrying pseudo-random signal sequences in randomly varying portions of the frequency spectrum.

17. Apparatus according to claim 16, wherein said transceiver includes a receiving portion, said receiving portion comprising:

first and second waveform detection means, said first detection means being matched to pseudo-random signal sequences carrying message information, said second detection means being matched to pseudo-random signal sequences carrying synchronization information; and signal receiving means for applying to said first waveform detection means only signals received from the frequency spectrum of the communications channel carrying message signals, and for applying to said second waveform detection means only signals received from said one unique portion of the frequency spectrum of said communications channel.

References Cited

UNITED STATES PATENTS

| | | | |
|---|---|---|---|
| 3,025,350 | 3/1962 | Lindner | 179—15 |
| 3,160,711 | 12/1964 | Schroeder | 179—15 |
| 3,204,035 | 5/1965 | Ballard et al. | 179—15 |
| 3,204,034 | 5/1965 | Ballard et al. | 179—15 |

OTHER REFERENCES

Pierce et al.: "Nonsynchronous Time Division With Holding and With Random Sampling," Bell Telephone System Technical Publication, Monograph 2041, January 1953, pp. 1–10 relied on.

RALPH D. BLAKESLEE, *Primary Examiner.*

U.S. Cl. X.R.

325—22

UNITED STATES PATENT OFFICE
CERTIFICATE OF CORRECTION

Patent No. 3,432,619 March 11, 1969

Herman L. Blasbalg

It is certified that error appears in the above identified patent and that said Letters Patent are hereby corrected as shown below:

Column 6, line 40, the equation should appear as shown below:

$$d = \sqrt{2}\left[1 - \frac{1}{2WT} \sum_{i=1}^{i=2WT} x_i y_i\right]^{1/2}$$

line 62, the equation should appear as shown below:

$$0.75 < \frac{d}{\sqrt{2}} < 1$$

line 70, the equation should appear as shown below:

$$0.30 < \frac{d}{\sqrt{2}} < 1$$

Column 10, line 26, "to", second occurrence should read -- of -- Column 17, line 21, "multiple-subscribed" should read -- multiple-subscriber --; line 22, "asigned" should read -- assigned -- line 43, "multiple-subscribed" should read -- multiple-subscribe --. Column 18, line 45, after "and" insert -- said --.

Signed and sealed this 12th day of May 1970.

(SEAL)
Attest:

EDWARD M.FLETCHER,JR.
Attesting Officer

WILLIAM E. SCHUYLER, J
Commissioner of Patent